No. 892,227. PATENTED JUNE 30, 1908.
F. A. CURRY.
VEIL PIN.
APPLICATION FILED FEB. 21, 1906.

Witnesses:
H. M. Powderly.

Inventor:
Florence A. Curry.

UNITED STATES PATENT OFFICE.

FLORENCE A. CURRY, OF ARLINGTON, MASSACHUSETTS.

VEIL-PIN.

No. 892,227.  Specification of Letters Patent.  Patented June 30, 1908.

Application filed February 21, 1906. Serial No. 302,191.

*To all whom it may concern:*

Be it known that I, FLORENCE A. CURRY, a citizen of the United States, residing at Arlington, Middlesex county, Massachusetts, have invented a new and useful Improvement in Veil-Pins, of which the following is a specification.

My invention is an improvement on that of Letters Patent Nos. 787,899 and 801,366 heretofore issued to me.

My invention consists in changes of form, material and combination of the working parts, and will be plain from the drawings, in which—

Figure 1:
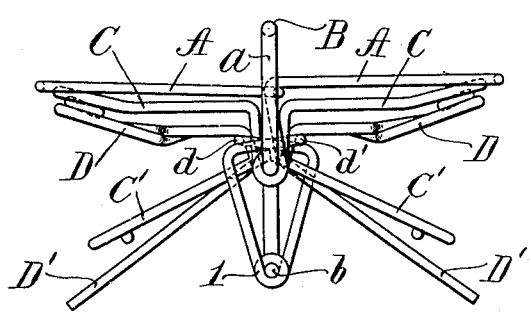
Figure 4:
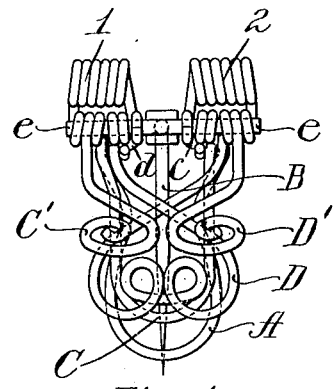
Figure 2:
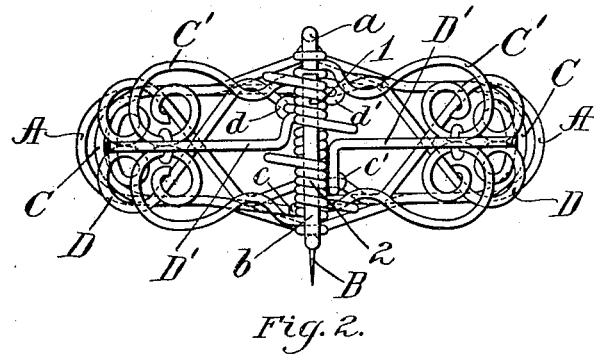
Figure 5:
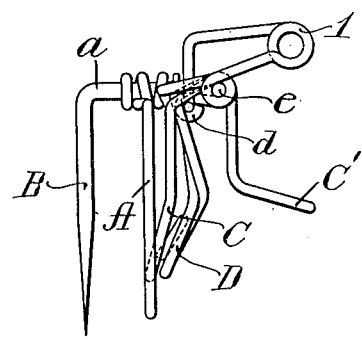
Figure 3:
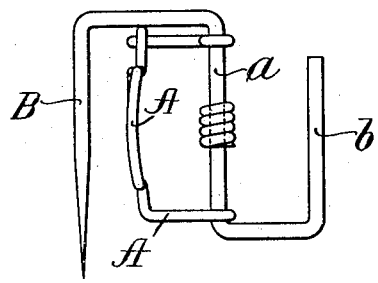
Figure 6:
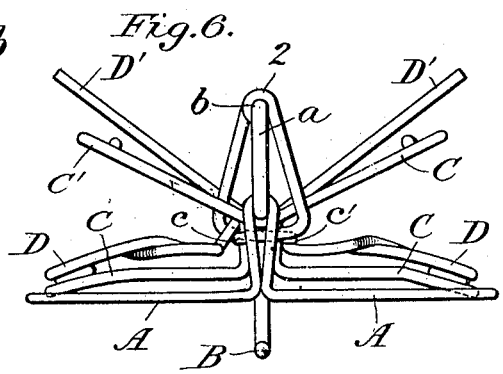

Figure 1 is top plan; Fig. 2 is front view; Fig. 3 is a detail; Fig. 4 is a modification; Fig. 5 is a side view of Fig. 4; Fig. 6 is a plan similar to Fig. 1 looking from the opposite side.

My improvement is preferably constructed wholly of wire.

My veil-pin is composed of a base A, two or more single or double leaves, one C, resting on the base, the other D resting on C; extensions C' of leaf C, and D' of leaf D, a rod $a$ bent to extend in one direction into $b$ (Fig. 3), and in the other direction into the fastening-pin B (Fig. 4). This rod $a$, $b$, supports the wire of which the veil-pin is constructed. In constructing the veil-pin the wire base A is rigidly attached to the rod $a$. The wire leaf C is formed as shown and its wire is extended and wound about rod $a$, and then formed into the extension C' (best shown in Fig. 2). The wire leaf D is formed as shown and its wire is extended and wound around rod $a$ and terminated in the extension D'. Springs 1 and 2 are coiled about rod $b$ and their ends pass beneath rod $a$ in such manner that spring 1 hooks around D at $d$ and, if there be a second or double leaf D, as in Figs. 1, 2 and 6, passes beneath rod $a$ and around its part $b$ to hook into said second or double part of leaf D at $d'$; while spring 2 hooks around leaf C at $c$ and if there be a second or double leaf C as in Figs. 1, 2 and 6, passes beneath rod $a$ and around its part $b$, to hook into said second or double leaf C at $c'$.

In Figs. 1, 2 and 3 the base-plate A is supported on rod $a$ which extends to form pin B. The clip or leaves C C are likewise supported, and extend to form the lifting projections C' C'; upon C C rests the clip or leaves D D, supported in the manner aforesaid and extending to form the lifting projections D' D'. The rod $a$ also extends to form the part $b$ around which are coiled the springs 1 and 2. Upon compressing extensions C' C' the leaves C C and also the leaves D D resting thereon will be lifted to receive or release the veil, both springs being in this case compressed; upon compressing extensions D' D' the leaves D D only will be lifted for the same purposes, only spring 1 being in this case compressed.

In Figs. 4 and 5 I show a modification of half the number of leaves shown in Figs. 1 and 2. Here A is the base, supported on the rod $a$ whose extension forms pin B, but C, the lower leaf, extends into projection C'; D, the upper leaf extends into projection D', and 1 and 2 are coiled operating springs. Spring 1 is a continuation of base A, and after taking a turn around rod $e$ (serving as a fulcrum for said springs) forms a coil as shown, and then hooks into leaf D at $d$, Figs. 4 and 5. Spring 2 may be similarly described except that after forming the coil it hooks into leaf C at $c$, Fig. 4. Upon compressing spring 1 and extension C', the leaf C and leaf D will be lifted; upon compressing spring 2 and extension D', leaf D will be lifted.

Having described my invention, what I claim is—

1. A veil-pin composed of a holding device whose rod is bent back above the holding portion to support the remaining parts; a wire base whose extension is rigidly attached to the said rod, a wire leaf normally bearing upon said base and having an extension wound about said rod and projecting above the same, a wire leaf normally bearing on the aforesaid leaf and having an extension which winds around said rod and projects above the same and springs normally holding down said leaves, all so combined that pressure upon the extension of the lower leaf will lift the same from the base and also lift the upper leaf, and pressure upon the extension of the upper leaf will lift the same from the lower leaf; substantially as described.

2. A veil-pin composed of a holding device B, having an angled rod $a$, $b$, a wire base A, having an extension winding about extension $a$, wire leaves C C normally bearing upon base A and having extensions C', C' winding about said rod $a$, and projecting above the same; wire leaves D D normally bearing on leaves C C and having extensions D' D' winding about said rod $a$ and projecting above said coils and springs normally holding down said leaves, all so combined that pressure upon extensions C' C' will lift the leaves C C and D D, and pressure upon extensions D' D' will lift leaves D D from leaves C C; substantially as described.

In witness whereof, I hereunto sign my name the seventeenth day of February, 1906.

FLORENCE A. CURRY.

Witnesses:
  H. M. POWDERLY,
  CHARLES W. WILKINS.